United States Patent
Yamada et al.

(10) Patent No.: US 6,491,437 B1
(45) Date of Patent: Dec. 10, 2002

(54) PLAIN BEARING AND PRODUCING METHOD THEREOF

(75) Inventors: Tatsuo Yamada, Nagoya (JP); Toshiaki Kawachi, Nagoya (JP); Hideo Ishikawa, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 7 days.

(21) Appl. No.: 09/644,303

(22) Filed: Aug. 23, 2000

(30) Foreign Application Priority Data

Sep. 14, 1999 (JP) .............................. 11-261009

(51) Int. Cl.$^7$ .............................. F16C 33/02
(52) U.S. Cl. ...................................... 384/284
(58) Field of Search ................ 384/293, 284, 384/285, 912, 276

(56) References Cited

U.S. PATENT DOCUMENTS 4,658,500 A    4/1987   Engel et al.
5,817,397 A  * 10/1998  Kamiya et al.

FOREIGN PATENT DOCUMENTS

| DE | 36 01 319 | 7/1986 |
| EP | 0 716 240 A1 | 6/1996 |
| EP | 0 758 721 A1 | 2/1997 |
| JP | 60-205014 | 10/1985 |
| JP | 62-124321 | 6/1987 |
| JP | 62-283216 | 9/1987 |

OTHER PUBLICATIONS

European Patent Office: Patent Abstracts of Japan: Abstract for JP 02 142921, "Sliding Bearing for Internal Combustion Engine", Komatsu Ltd., Jun. 1, 1990.

* cited by examiner

*Primary Examiner*—Lenard A. Footland
(74) *Attorney, Agent, or Firm*—Browdy and Neimark

(57) ABSTRACT

Disclosed is a plain bearing comprising a back metal, a bearing alloy layer provided on the inner surface of the back metal, an intermediate layer provided on the bearing alloy layer and an overlay provided on the intermediate layer. The bearing alloy layer has a textured uneven inner surface, comprising a number of protrusions, which has been formed by etching of the inner surface provided with a mask. A feature and a pattern of the uneven surface can be optionally and accurately formed by designing appropriately the mask. For example, the protrusions may be a form of square, circle or lozenge cross-section, or a ridge extending in an optional direction, e.g. circumferentially, perpendicularly or obliquely to the circumference. After the overlay considerably wears, there will appear a surface state in which the bearing alloy layer, the intermediate layer and the residual soft overlay in the etched recess coexist.

6 Claims, 3 Drawing Sheets

PLAIN BEARING AND PRODUCING METHOD THEREOF

BACKGROUND OF THE INVENTION

1. Field of the Invention

The present invention relates to a plain bearing and a producing method thereof.

2. Brief Description of the Art

There has been known a plain bearing in which a bearing alloy layer is provided on a back metal and an overlay layer is provided on the bearing alloy layer thereby providing the bearing with improved properties of conformability and embeddability for foreign substances, the overlay layer consisting of a soft material such as a Pb—Sn alloy. In the case where the bearing alloy layer is of a copper alloy system, there has been provided a hard intermediate layer made of Ni, for example, between the bearing alloy layer and the overlay layer in order to prevent a compositional change of the overlay layer due to diffusion of alloy components of the overlay layer into the bearing alloy layer. Also in the case where the bearing alloy layer is of an aluminum system, there has been provided a hard intermediate layer made of Ni, for example, between the bearing alloy layer and the overlay layer in order to securely bond the both layers. However, in the case where the overlay layer wears to expose the hard intermediate layer over a broad area with the operation of the bearing, a mating shaft becomes to be in direct sliding-contact with the hard intermediate layer resulting in that seizure is liable to occur quickly. Thus, there have been known various techniques which were proposed in order to keep anti-seizure property of the composite plain bearings, according to which the bearing alloy layer is provided with an uneven inner surface and the intermediate layer is formed on the bearing alloy layer so as to follow the uneven inner surface and also have an identical uneven surface thereto, whereby, even if the overlay layer formed on the intermediate layer wears to expose the intermediate layer, the soft overlay layer will partially remain in recesses of the uneven surface of the intermediate layer.

According to an invention of JP-A-60-205014, for example, when producing a composite plain bearing having a back metal, a bearing alloy layer, an intermediate layer and an overlay layer, a spiral groove(s) is formed circumferentially on the inner surface of the bearing alloy layer by the boring machining thereby providing an uneven surface to the bearing alloy layer, and subsequently the intermediate layer and the overlay layer are formed on the bearing alloy layer in this order.

According to another invention of JP-A-62-124321, when producing a composite plain bearing having a back metal, a bearing alloy layer, an intermediate layer and an overlay layer, the inner surface of the bearing alloy layer is subjected to a shot peening treatment with ceramic particles to form an uneven surface, and subsequently the intermediate layer and the overlay layer are formed on the bearing alloy layer in this order.

According to still another invention of JP-A-62-283216, when producing a composite plain bearing having a back metal, a bearing alloy layer, an intermediate layer and an overlay layer, the inner surface of the bearing alloy layer is subjected to an electrolytic etching treatment to form recesses each having 5 $\mu$m of depth, and subsequently the intermediate layer having 0.3 $\mu$m of depth and the overlay layer having 5 $\mu$m of depth are formed on the bearing alloy layer in this order.

But, in the case of the uneven surface formed by the boring machining, because of circumferentially extended parallel grooves thereon, when the overlay layer wears, there will appear a stripe pattern surface state consisting of a combination of linear material zones which extend circumferentially and are parts of the intermediate layer and the overlay layer. Whereas, when a foreign substance enters between the bearing and the shaft, a long scratch is formed on the linear overlay material zones resulting in deteriorated anti-seizure property and/or occurrence of fatigue cracks which might extend circumferentially.

In the case of the uneven surface formed by the shot peening, because the surface of the bearing alloy layer is work-hardened, the bearing can not have desired bearing properties including the sliding-contact property.

Further, in the case of the uneven surface formed by the electrolytic etching, because the etching treatment relies on the characteristics that grain boundaries are preferentially eroded while inter-grains are eroded slowly, the etched surface state is limited to have forms of crystal grains of the bearing alloy, so that it is hard to have deep recesses with around 10 $\mu$m while shallow recesses with not more than around 5 $\mu$m may be possible. Thus, in the case where the intermediate layer is provided between the bearing alloy layer and the overlay layer to have an enough large thickness so as to well exhibit the above mentioned functions thereof, as schematically shown in FIG. 6, when a wear loss advances to the depth level Y, the intermediate layer 4 is exposed through the almost overall sliding-contact surface. In order to avoid this, it is necessary to make the intermediate layer extremely thinner. Although the prior art of JP-A-62-283216 teaches to form 0.3 $\mu$m of the intermediate layer, it will be hard to absolutely coat the bearing alloy layer with such a very thin intermediate layer resulting in lack of reliability.

BRIEF SUMMARY OF THE INVENTION

Accordingly, an object of the present invention is to provide a plain bearing which can be obtained by an etching treatment with utilization of a mask so that an inner surface of a bearing alloy layer can be an optional form of an uneven surface having a fully deep recess without changing properties of the bearing alloy layer.

According to a first aspect of the invention, there is provided the plain bearing which comprises a back metal, a bearing alloy layer, an intermediate layer and an overlay layer provided on the intermediate layer, wherein the bearing alloy layer has a textured uneven surface formed by the etching treatment and the intermediate layer is formed on the uneven surface of the bearing alloy layer so as to follow the textured uneven surface so that the intermediate layer has also a textured uneven surface.

According to the plain bearing, when the overlay layer wears to expose the hard intermediate layer, there appears a surface state that a number of exposed protrusions of the intermediate layer and the soft overlay layer being filled in the recess coexist because the intermediate layer has the uneven surface, whereby the hard intermediate layer can be prevented to expose through a broad area thereby preventing occurrence of seizure.

Also according to the plain bearing, because the textured uneven surface of the bearing alloy layer can be formed by the etching treatment to have an exactly identical to an etching pattern of the mask, the uneven surface state can be optionally formed.

For example, the protrusions of the textured uneven surface in the intermediate layer as well as the bearing alloy layer may be a form of square, circle or lozenge cross-section, or ridges extending in an optional direction, for example, circumferentially, perpendicularly or obliquely to the circumference.

The mask may be of pad printing, screen printing, a photoresist film and so on.

According to a second aspect of the invention, there is provided a method of producing a plain bearing which comprises a back metal, a bearing alloy layer provided on the inner surface of the back metal, an intermediate layer provided on the bearing alloy layer and an overlay layer provided on the intermediate layer, the method comprising the steps of:

- coating the inner surface of the bearing alloy layer with a masking material defining a surface area part of the bearing alloy layer to be etched;
- etching the coated inner surface of the bearing alloy layer to form a textured uneven surface comprising a number of protrusions;
- removing the coated masking material from the inner surface of the bearing alloy layer;
- providing the intermediate layer on the etched inner surface of the bearing alloy layer so as to follow the textured uneven surface of the bearing alloy layer so that the intermediate layer has also a textured uneven surface; and
- coating the surface of the intermediate layer with an overlay layer.

According to the method, because the uneven surface of the bearing alloy layer is formed by the etching treatment, bearing characteristics of the bearing alloy layer can be maintained in contrast to a case where the uneven surface is formed by shot-peening resulting in occurrence of work-hardening.

Also according to the method, because the mask well defines an opening part corresponding to a recess at the uneven surface which is formed by etching, the uneven surface state of the bearing alloy layer can be formed optionally and accurately.

In the invention, because the bearing alloy layer is provided with the uneven inner surface with a recess, which is formed by the masking-etching method, and the intermediate layer is formed on the bearing alloy layer so as to follow the uneven surface of the bearing alloy layer, the uneven surface can be an optional state so that the plain bearing has excellent anti-seizure property and can be produced easily.

Herein after, referring to the attached drawings, a preferred embodiment of the invention will be described.

BRIEF DESCRIPTION OF A PREFERRED EMBODIMENT OF THE PRESENT INVENTION

Figure 1:
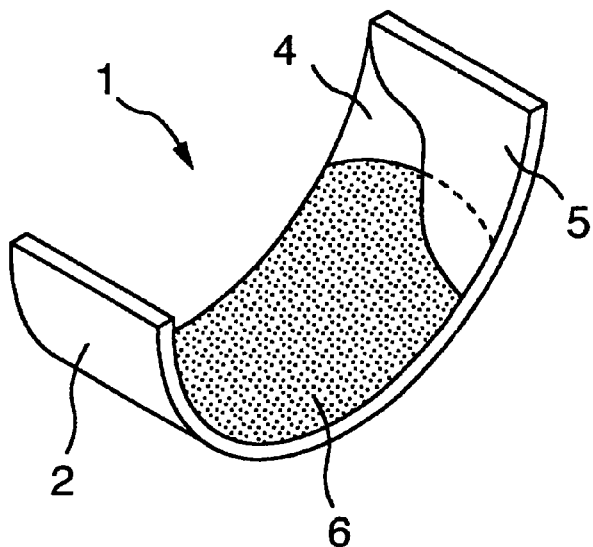
FIG. 1 is a perspective view of a plain bearing according to the invention, in which an overlay layer is partially exposed for explanation purpose.
Figure 2:
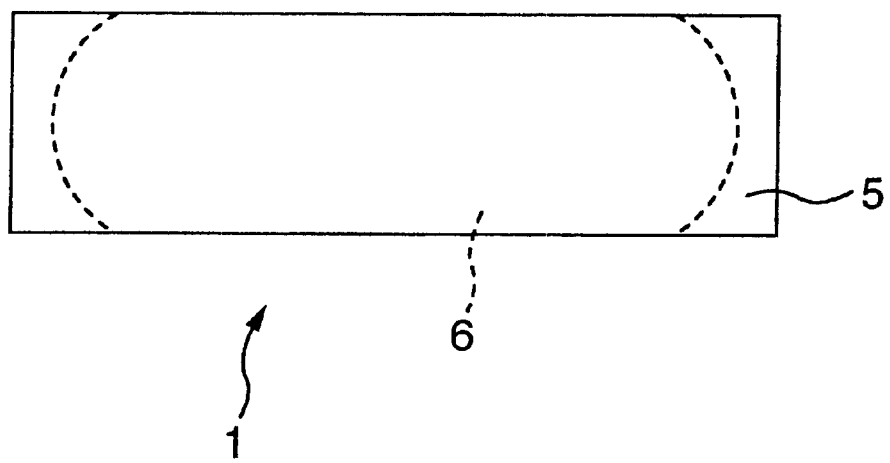
FIG. 2 shows the inner surface of the plain bearing as a developed drawing.
Figure 3:
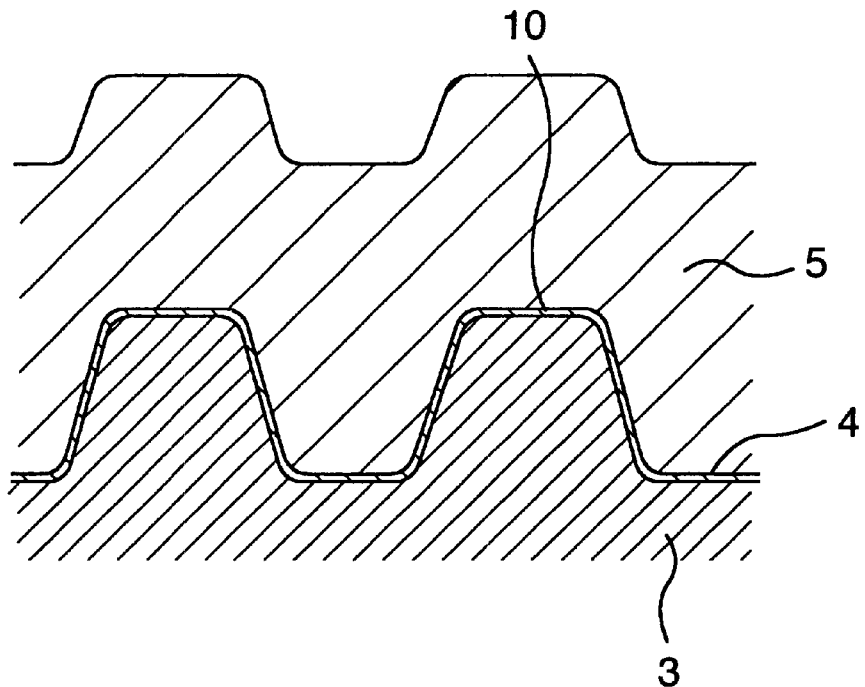
FIG. 3 is a partial sectional view of the plain bearing at an etched surface zone with a larger horizontal scale and a smaller vertical scale.

First, a description of producing a plain bearing 1 as one embodiment of the invention will be provided with reference to FIGS. 1 to 3.

A bimetal is prepared, which consists of a back metal 2 (not shown in FIG. 3) and a bearing alloy 3 being made of a copper alloy and bonded to the back metal.

The bimetal is sheared to have a predetermined size and subsequently bent mechanically to a hemi-cylindrical form. The hemi-cylindrical member is subjected to machining to the hemi-cylindrical plain bearing 1 having an outer diameter of 56 mm and a width of 26 mm.

The plain bearing 1 is subjected to a pre-treatment of degreasing by water cleaning, electrolytic degreasing and pickling in this order. Thereafter, an etching zone 6 of the inner surface of the plain bearing 1 is coated with a mask. In the present embodiment, the mask is provided on the inner surface by the pad printing with utilization of a masking material of HER300 (a trade mark) produced by OKUMURA SEIYAKU KOHGYO K.K.

While a mask pattern formed by the pad printing can be any desired form as well known, in the present embodiment, the pattern described after is selected. The masking material of HER300 (a trade mark) has excellent anti-acid and anti-alkaline properties. The masking material is also applied to the all remaining surface parts of the inner, back and ends surfaces other than the etching zone 6 to coat those parts. Thus, an etching treatment takes place after the plain bearing 1 is totally covered with the masking material. The etching is carried out as an electrolytic treatment under the following conditions.

1. Etching solution: nitric acid=20 ml/l, hydrochloric acid=20 ml/l and hydrogen peroxide=20 ml/l.
2. Current density: 2 A/dm$^2$
3. Temperature: 20° C.
4. Etching time: 10 minutes
In the etching treatment, a surface part of the bearing alloy layer, which is not covered with the mask formed by the pad printing, is etched to form a recess of 20 μm depth, while the other part of the bearing alloy layer, which is covered with the mask, remains without etching to become protrusions 10. The etching depth can be adjusted by optionally changing the electrolytic etching conditions. After the electrolytic etching, the plain bearing is washed by water and the mask is removed therefrom.

Next, the plain bearing is subjected to an electrolytic pickling treatment followed by Ni plating to form an intermediate layer 4 with a thickness of 1.5 μm. In this, the intermediate layer 4 of Ni is formed so as to cover and follow the uneven etched surface of the bearing alloy layer. Thereafter, an overlay layer 5 of a Pb—Sn alloy with a thickness of 20 μm is formed by plating. The thus obtained plain bearing 1 is subjected to a finish machining to a final product as shown in FIGS. 1 and 2.

The plain bearing 1 produced by the above processes consists of the back metal 2; the bearing alloy layer 3 made of a copper alloy (see FIG. 3) being formed on the inner surface of the back metal 2; the intermediate layer 4 of Ni being formed on the inner surface of the bearing alloy layer 3 and having a thickness of 1.5 μm; and the overlay layer 5 of a Pb—Sn alloy being formed on the intermediate layer and having a thickness of 20 μm.

The hemi-circular plain bearing 1 as shown in FIGS. 1 and 2, which is one embodiment of the invention, is produced to provide the bearing alloy layer with an etched surface zone 6 extending circumferentially toward the both direction from the center of the plain bearing, at which an oil film with a minimum thickness (Hmin.) will be formed during operation, with respect to a mating shaft incorporated to the plain bearing according to operating conditions, the extending etched surface zone being within a circumferential central angle range of 140°, namely both angle ranges of 70° with reference to the circumferential phantom center line. The etched surface zone 6 of the bearing alloy layer 3 is of an uneven surface comprising a number of protrusions 10 which remains without etching.

Figure 4:
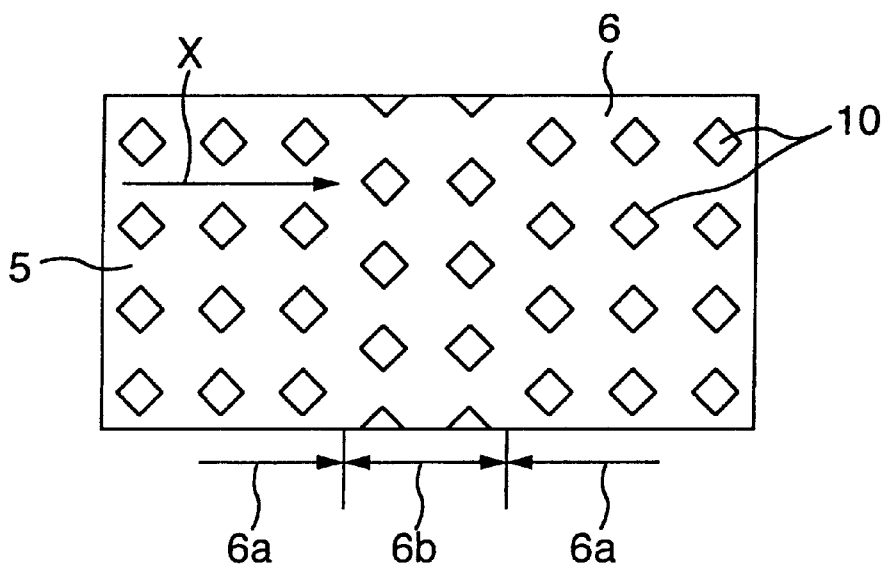
FIG. 4 is an enlarged and developed view of the partially exposed inner surface of the plain bearing shown in FIG. 1.

The protrusions 10 are arranged in accordance with two types of pattern (6a, 6b) as shown in an enlarged drawing of FIG. 4. The respective protrusions 10 has a square top shape of which side edges (each thereof has a length of 0.1 mm) are oblique by an angle of 45° to the circumferential side ends of the hemi-circular plain bearing. Referring to FIG. 4, the two types of protrusion pattern (6a, 6b), which consist of a primary pattern 6a and a secondary pattern 6b, are arranged such that there exists a zone of pattern 6b, which consists of two rows of protrusions, between two zones of pattern 6a, each of which consists of three rows of protrusions. While the protrusions 10 in the respective pattern type line up transversely in FIG. 4, with regard to the arranged positions of the protrusions, the protrusion lines in the pattern 6b differ from those in the pattern 6a in the axial direction such that the transverse protrusion lines of one of the patterns 6a and 6b correspond to the space areas between adjacent protrusion lines of the other of the patterns 6a and 6b. It is also noted that, at the both circumferential end zones other than the etched surface zone 6, the inner surface of the bearing alloy layer 3 remains smooth.

In the present embodiment, the etched surface zone 6 includes a surface area rate of about 25% of the all protrusions 10.

Figure 5:
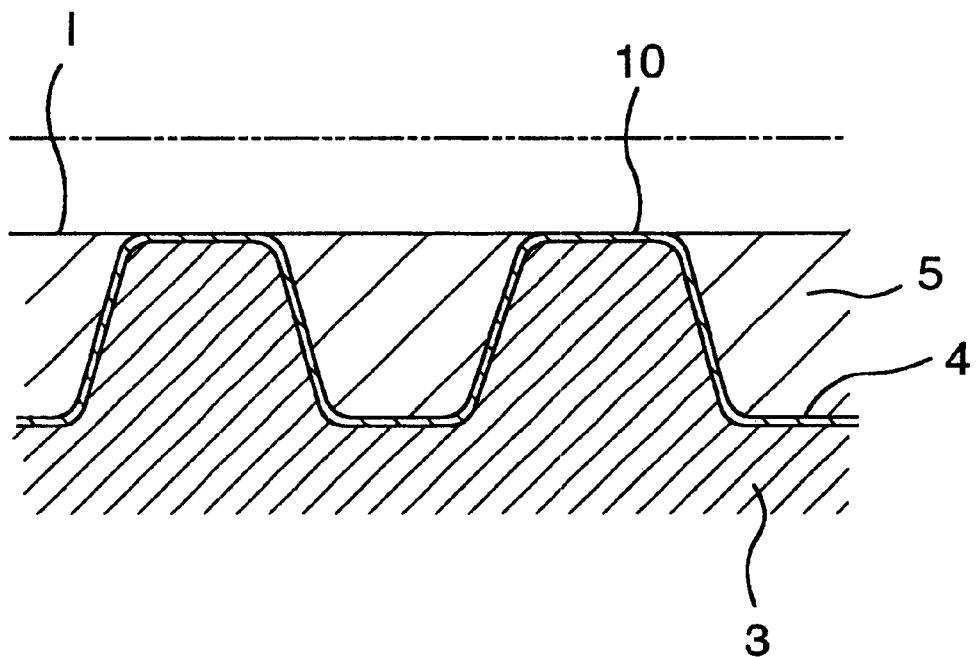
FIG. 5 is a supposed drawing, in which the overlay layer has been considerably lost by wear, and which corresponds to FIG. 3.
Figure 6:
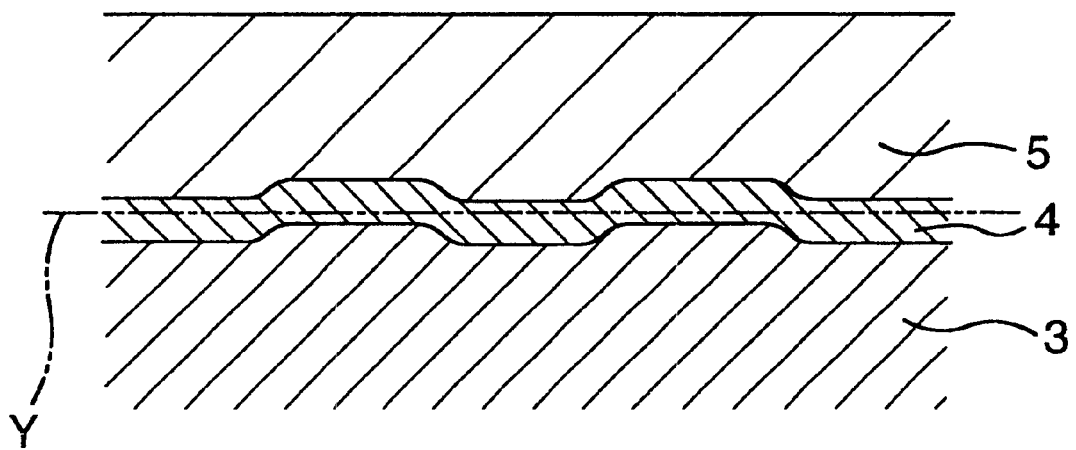
FIG. 6 is a similar sectional view to FIG. 3, which shows a feature of an unevenly etched surface of a conventional plain bearing.

When the embodiment plain bearing is mounted in a housing (not shown in the drawings) and operatively used and the overlay layer wears with time progress to reach the wear level I as shown in FIG. 5, the intermediate layer 4 being formed on the protrusions 10 will be exposed. In this state, because the surface area rate of the protrusions 10 in the etched surface zone 6 is only about 25%, while the mating shaft (not shown in the drawings) supported by the plain bearing is in sliding-contact with the intermediate layer 4 on the protrusions 10, it is also in contact with predominantly the soft overlay layer 5 which occupies the remaining surface area rate of about 75% in the etched surface zone 6 whereby the anti-seizure property can be held.

On the other hand, as shown by an arrow X in FIG. 4, when a foreign substance is put into the interface between the plain bearing and the mating shaft, although it will move along a part of the overlay layer 5 in the primary pattern zone 6a, after reaching the secondary pattern 6b, it will be well stopped by the protrusions 10 as an obstacle whereby a deterioration of anti-seizure property can be well prevented while the deterioration may usually occur due to a heavy damage of the overlay layer 5.

Further, even if a fatigue crack is generated in the overlay layer 5, a propagation thereof can be well prevented by surrounding protrusions 10 thereby keeping the fatigue crack only within a small area zone.

It is noted that, in the above embodiment, the etching depth of the inner surface of the bearing alloy layer 3 is 20 µm, the thickness of the intermediate layer 4 is 1.5 µm and the thickness of the overlay layer 5 is 20 µm. Thus, the overlay layer 5, which is formed by plating, has also a similar uneven inner surface having protrusions followed to that of the bearing alloy layer 3. This means that the mating shaft (not shown in the drawings) is supported primarily by protrusion parts of the overlay layer 5 at the initial operation stage while exhibiting excellent initial conformability and also excellent initial anti-seizure property because of flowing susceptibility of lubricant oil.

While one embodiment of the invention has been described above, of course the invention is not limited to it and can be practiced within a scope without departing from the spirit and principle of the invention as exemplified below.

(1) While the bearing alloy layer 3 consists of a copper alloy in the embodiment, it may be made from other materials including an aluminum alloy.

(2) While the intermediate layer 4 consists of Ni in the embodiment, it may be made from any one of Co, Fe, Cr, Ag and alloys thereof.

(3) While the overlay layer 5 consists of a Pb—Sn alloy in the embodiment, it may be made from other soft materials, e.g. resin or a tin system alloy. Further, although the overlay layer 5 in the embodiment has an uneven inner surface which follows the uneven surface of the bearing alloy layer 3 because the overlay layer is formed by plating, such an uneven surface is not always essential for the overlay layer but may be smooth.

(4) While the etching depth of the bearing alloy layer 3 is 20 µm in the embodiment, it may be 5 to 50 µm according to optional selection of etching conditions.

(5) While the respective protrusion 10 has a square top shape of which side edges (each thereof has a length of 0.1 mm) are oblique by an angle of 45° to the circumferential side ends of the hemi-circular plain bearing in the embodiment, with regard to the form and/or the arrangement pattern, they may be modified differently as desired.

What is claimed is:

1. A plain bearing comprising a back metal, a bearing alloy layer provided on the inner surface of the back metal, an intermediate layer provided on the bearing alloy layer and an overlay layer provided on the intermediate layer, wherein:

the bearing alloy layer has an inner surface having a textured uneven surface, said textured uneven surface comprising a number of protrusions, wherein said protrusions are of predetermined size and shape, which textured uneven surface has been formed by etching of the inner surface provided with a mask whereby masked areas are protected from etching, wherein the etching depth of the bearing alloy layer is at least 10 µm up to 50 µm; and wherein the intermediate layer is formed on the uneven surface of the bearing alloy layer so as to follow the textured uneven surface so that the intermediate layer has also a textured uneven surface.

2. The plain bearing of claim 1 wherein said depth is about 20 µm.

3. A plain bearing comprising a back metal, a bearing alloy layer provided on the inner surface of the back metal, an intermediate layer provided on the bearing alloy layer and an overlay layer provided on the intermediate layer, wherein:

the bearing alloy layer has an inner surface having a textured uneven surface, said textured uneven surface comprising a number of protrusions, wherein said protrusions are of predetermined, repeating and consistent size and shape, which textured uneven surface has been formed by etching of the inner surface provided with a mask whereby masked areas are protected from etching, wherein the etching depth of the bearing alloy layer is at least 10 μm up to 50 μm; and wherein the intermediate layer is formed on the uneven surface of the bearing alloy layer so as to follow the textured uneven surface so that the intermediate layer has also a textured uneven surface.

4. The plain bearing of claim 3 wherein said protrusions have a rectangular top shape.

5. The plain bearing of claim 4 wherein each of said protrusions has a square top shape with four side edges having a length of approximately 0.1 mm.

6. The plain bearing of claim 5 wherein said protrusions having a square top shape are aligned obliquely by an angle of approximately 45° to circumferential side ends of said plain bearing.

* * * * *